W. Hunt,
Inkstand.
No. 4062.        Patented May 29, 1845.
Fig. 1
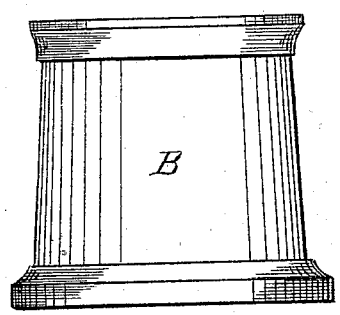
Fig. 2
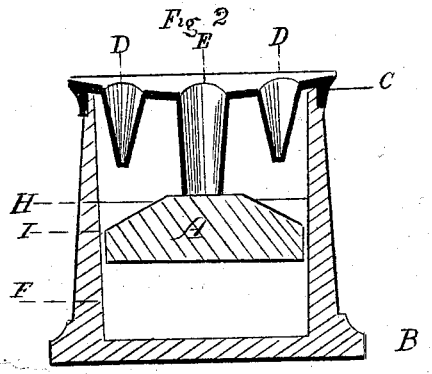
Fig. 3
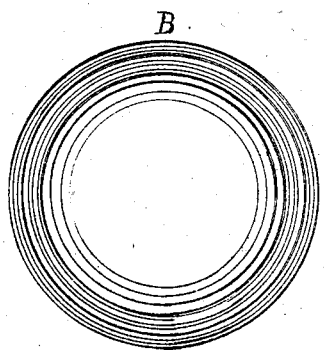
Fig. 4
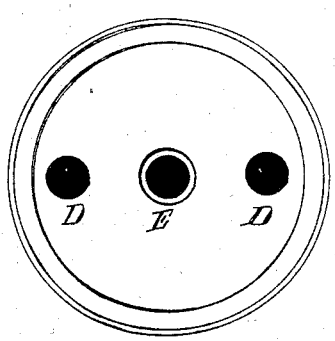
Fig. 5
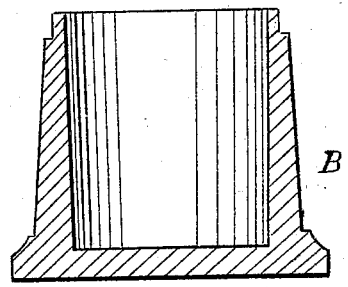
Fig. 6
Fig. 7
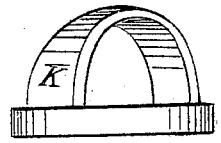

UNITED STATES PATENT OFFICE.

WALTER HUNT, OF NEW YORK, N. Y., ASSIGNOR TO AUGUSTUS T. ARROWSMITH.

INKSTAND.

Specification of Letters Patent No. 4,062, dated May 29, 1845.

*To all whom it may concern:*

Be it known that I, WALTER HUNT, of the city, county, and State of New York, have made a new and useful Improvement in the Construction of Inkstands, and that the following is a full and accurate description of the same.

My said improvement consists in the introduction of a float upon the surface of, or submerged in the ink, which float, I make of cork, see Figure 2, letter A, in the annexed drawings, which figure exhibits a cut vertical section of my ink-stand made in two parts, viz., the glass cup, or reservoir B, and the metallic cap C, in which cap, or top, are the ordinary pen sockets D, D, and ink tube E, against the bottom of which tube, the float A is buoyed up by the ink F, contained in the glass cup B, thereby wholly closing the bottom of said tube, and excluding the passage of the external atmosphere through the same.

When the stand is newly filled, the ink will flow to the line H, over the base of the float, (which is in the form of a truncated cone, with a cylindrical base) in which base, a considerable portion of the ink would be exposed to the action of the atmosphere, through the ink-tube E, were it not excluded by means of the float A, as before described. It will be seen that the said float will retain its position and operate as a stopper to the ink-tube, until the ink is reduced below the conical part of the float, to the upper line of its base at I, at which elevation the float covers the whole surface of the ink, wholly protecting it from the atmosphere until it is exhausted by use. One other important advantage of this arrangement is, that at each introduction of the pen, the float is forced down and operates as a loose plunger in removing the sediment, which is ordinarily deposited in the bottom of the stand, and forces it upward and remingles it with the fluid, thereby preventing the separating and consequent deterioration of the ink; the point of the pen is also kept constantly clean, when in use, in consequence of it penetrating the upper surface of the cork, whenever it is filled with ink. Although other materials may be substituted for cork, in forming said float, I have adopted this article as preferable in consequence of its lightness, cleanliness and durability. An elastic arch K, made of a fillet of sheet india rubber, may be placed across the center of, and nearly spanning the upper surface of said float A, into which, the feet of said arch are inserted. (See Fig. 7.) By this arrangement the crown of said arch will, at all times, (except when forced down by the pen) bear against and cover the bottom of the tube E, instead of the cork A, which will remain submerged, when the stand is full, and nearly so, until it is exhausted.

The body or reservoir of the stand, may be made of metal, best calculated to resist the action of the ink, or coated with cement for that purpose, but I consider glass preferable in every respect, which may be made in the form of a plain cylindrical cup in the inside, with such external form as fancy may suggest, see Fig. 1, which presents a profile view of a form which I shall adopt for one style of stand, which is here exhibited entire in its external form, with the metallic cap C, complete, which cap is cemented with shellac, caoutchouc or other proper luting, by means of a flange to the upper rim of the reservoir as shown in Fig. 2, as before mentioned.

Fig. 3 is an elevated view of the float A. Fig. 4 gives a similar view of the ink-stand and the cap C. Fig. 5 also presents a top view of the glass reservoir B, and Fig. 6, a vertical cut section of the same.

What I claim as new, and my own invention in the within above described ink stand, is—

The introduction of a float with a soft yielding or elastic upper surface, and so formed as to operate at all times either as a stopper to the ink tube, or a floating cover to, and upon the surface of the ink in said stand, arranged substantially in the manner, and for the purposes, herein above set forth and described.

New York, July 12th, 1844.

WALTER HUNT.

Witnesses:
C. NAGLE,
JACOB DE BOIS.